US009090786B2

(12) United States Patent
Boris et al.

(10) Patent No.: US 9,090,786 B2
(45) Date of Patent: Jul. 28, 2015

(54) INKJET PRINTING FLUID COMPOSITION

(75) Inventors: David Charles Boris, Webster, NY (US); Teresa Joy Hosmer, Webster, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 320 days.

(21) Appl. No.: 13/601,259

(22) Filed: Aug. 31, 2012

(65) Prior Publication Data

US 2014/0063156 A1 Mar. 6, 2014

(51) Int. Cl.
| | |
|---|---|
| *B41J 2/01* | (2006.01) |
| *C09D 11/10* | (2014.01) |
| *B41J 2/21* | (2006.01) |
| *C09D 133/26* | (2006.01) |
| *C09D 171/02* | (2006.01) |
| *C09D 11/102* | (2014.01) |
| *C09D 11/106* | (2014.01) |
| *C09D 11/322* | (2014.01) |

(52) U.S. Cl.
CPC ............... *C09D 11/10* (2013.01); *B41J 2/2107* (2013.01); *C09D 11/102* (2013.01); *C09D 11/106* (2013.01); *C09D 11/322* (2013.01); *C09D 133/26* (2013.01); *C09D 171/02* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00

USPC ........... 347/105, 101, 100, 99, 88, 96, 95, 21, 347/20, 9; 106/31.6, 31.13, 31.27; 523/160, 523/161

See application file for complete search history.

(56) References Cited

U.S. PATENT DOCUMENTS

| | | |
|---|---|---|
| 4,680,332 A | 7/1987 | Hair et al. |
| 5,180,624 A | 1/1993 | Kojima et al. |
| 6,475,271 B2 | 11/2002 | Lin |
| 7,004,579 B2 | 2/2006 | Sato et al. |
| 7,478,902 B2 | 1/2009 | Prasad et al. |
| 7,556,680 B2 | 7/2009 | Lee et al. |
| 7,622,513 B2 | 11/2009 | Sarkisian et al. |
| 7,696,262 B2 | 4/2010 | Cagle et al. |
| 7,862,653 B2 | 1/2011 | Sanada et al. |
| 7,878,643 B2 | 2/2011 | Kudo et al. |
| 8,021,516 B2 | 9/2011 | Chen et al. |
| 2002/0156155 A1* | 10/2002 | Lin |
| 2004/0214002 A1* | 10/2004 | Granick et al. ............ 428/411.1 |
| 2006/0004125 A1* | 1/2006 | Taguchi et al. ............... 523/160 |
| 2006/0116439 A1 | 6/2006 | Sarkisian et al. |
| 2007/0120928 A1 | 5/2007 | Ma et al. |
| 2008/0049086 A1 | 2/2008 | Rolly |
| 2008/0317960 A1* | 12/2008 | Pitt et al. ....................... 106/311 |

* cited by examiner

*Primary Examiner* — Manish S Shah
(74) *Attorney, Agent, or Firm* — Andrew J. Anderson; Raymond L. Owens

(57) ABSTRACT

An inkjet printing fluid composition including water, a colorant, and a first polymer and a second polymer, wherein the first and second polymers have interactive functional groups and the second polymer is selected to form in the fluid a water soluble associated complex with the first polymer. Each of the first and second polymers are present at a concentration of at least 0.1 wt %, and the first and second polymers are present at a combined concentration of at least 1 wt %.

18 Claims, 3 Drawing Sheets

INKJET PRINTING FLUID COMPOSITION

FIELD OF THE INVENTION

The invention relates generally to the field of inkjet printing fluids, and in particular to inkjet inks comprising a water soluble complex of first and second polymers. More specifically, the invention relates to specially formulated inks which result in improved optical density for printed images.

BACKGROUND OF THE INVENTION

Ink jet printing is a non-impact method for producing printed images by the deposition of ink droplets in a pixel-by-pixel manner to an image-recording element in response to digital data signals. There are various methods that may be utilized to control the deposition of ink droplets on the image-recording element to yield the desired printed image. In one process, known as drop-on-demand ink jet, individual ink droplets are projected as needed onto the image-recording element to form the desired printed image. Common methods of controlling the projection of ink droplets in drop-on-demand printing include piezoelectric transducers and thermal bubble formation. In another process, known as continuous ink jet, a continuous stream of droplets is charged and deflected in an image-wise manner onto the surface of the image-recording element, while un-imaged droplets are caught and returned to an ink sump. Ink jet printers have found broad applications across markets ranging from desktop document and photographic-quality imaging, to short run printing and industrial labeling.

The ink compositions known in the art of inkjet printing may be aqueous- or solvent-based, and in a liquid, solid or gel state at room temperature and pressure. Aqueous-based ink compositions are preferred because they are more environmentally friendly as compared to solvent-based inks, and most printheads are designed for use with aqueous-based inks.

The ink composition may be colored with pigments, dyes, polymeric dyes, loaded-dye/latex particles, or any other types of colorants, or combinations thereof. Pigment-based ink compositions are advantageous because such inks render printed images giving comparable optical densities with better resistance to light and ozone image degradation as compared to printed images made from other types of colorants. The colorant in the ink composition may be yellow, magenta, cyan, black, gray, red, violet, blue, green, orange, brown, etc. These inks may further contain polymeric binders.

Although numerous ink compositions are known in the art of inkjet printing, several key challenges remain. One challenge is to obtain the highest possible image quality on a variety of inkjet receivers. It is further desirable to obtain the highest optical density for a given amount of ink applied to an inkjet receiver, especially on plain papers.

A further challenge for inks comprising both pigments and polymeric binders is managing their ability to function in the printer system. Ink must properly wet felt employed to regulate pressure in a printhead so that flow of ink through the printhead occurs only when desired. Management of the surface tension of inks is also required to enable delivery of ink through a printhead in addition to aiding wetting of the surface of the substrate to which the ink is applied.

In addition to the desirability for an ink to have a good optical density when printed on plain paper, there are a number of constraints on the physical properties of an inkjet ink so that it can function effectively in an inkjet printer and make a lasting image. These properties include viscosity and rheology, ink physical stability, redispersibility of dried ink for circulating systems, surface tension and wetting, and jetting performance including drop formation stability, satellite suppression, print window, latency, and repeated firability. It is also important that inks dry fast on the paper, do not repel one another, and absorb into the substrate without bleeding when over printed with different colors. The dried inks need to have good image permanence including fade and scratch resistance.

To provide desired performance, inkjet printing fluid compositions may include various water soluble or dispersible polymers, dispersing aids to prevent flocculation of dispersed materials, and surfactants.

U.S. Pat. No. 4,680,332 describes a heterophase ink with a water insoluble polymer, a solvent soluble dye and a nonionic stabilizer permanently attached to the polymer, dispersed in water and alcohol; ST 45 to 65 dynes/cm. The stabilizer is either: an EO-PPO block copolymer such as Pluronic F68, poly(ethylene oxide) tertiary octylphenol, poly(vinyl alcohol), poly(acrylic acid), hydroxypropyl cellulose, poly(vinyl pyrrolidone), poly(ethylene oxide), poly(ethylene imine), or poly(ethylene oxide)monomethyl ether. This patent discloses the use of a blend of polymers for improved ink performance, specifically an insoluble polymer with a PEO containing nonionic stabilizer polymer. The polymer blend principally allows incorporation of oil soluble dyes in an aqueous ink formulation.

U.S. Pat. No. 5,180,624 discloses an ink receiving layer with polymer binder, silica, cationic polymers etc which is coated on top of paper. This patent discloses using one or more water soluble polymer fillers with good ink affinity and includes a long list of polymers which includes both PEO and PAM polymers, alone or in combination, to form an ink receiving layer.

U.S. Pat. No. 7,004,579 discloses a large variety of polyvinyl ether block copolymers which are complexed with various functional groups to impart temperature, pH, and evaporation sensitivity and yield inks that respond to these stimuli. The PEO containing diblock copolymers described are directly covalent bound to black or colored pigments.

U.S. Pat. No. 7,556,680 discloses a pigmented ink with an added amide compound such as uracil, thymine, sarcosine anhydride, glycine, and alanine, to improve the stability of the ink, water fastness, and wet and dry rub performance. This patent discloses oligomeric amide compounds used with low Mw PEOs (400-600) in carbon black inks.

U.S. Pat. No. 6,475,271 discloses a black ink with PAM and PEO polymer added together for the purpose of obtaining low intercolor bleed and improved MFLEN (mid frequency line edge noise) for carbon blacks by adding two low boiling alcohols or thiols (<115C and <135C BP). Example 6 of this patent discloses PEO at 0.05 weight percent and PAM at 0.5 weight percent together in a black ink.

U.S. Pat. No. 7,878,643 discloses dye-based ink formulations with preferable ranges for dynamic surface tension at 50 ms and at 500 ms lifetimes, as determined by maximum bubble pressure method (referred to herein as MBP nominal surface age, or MBP age), with a difference between these dynamic surface tensions of 7 mN/m or more.

U.S. Pat. No. 7,862,653 teaches that it is desirable to have the dynamic surface tension of the ink to be at least 49 mN/m or more at a lifetime of 50 milliseconds as determined by MBP method for improved optical density. The patent further discloses that this ink preferably have a difference between the dynamic surface tension at a lifetime of 50 milliseconds (MBP method) and the dynamic surface tension at a lifetime of 5,000 milliseconds (MBP method) of 15 mN/m or more to obtain improvements in both optical density and fixing ability.

Controlling surface tension using fluorinated surfactants has been employed in various ink formulations in the art, frequently in combination with the use of other classes of surfactants where either or both surfactants are at relatively high concentrations in the inks, such as in U.S. Patent Application 2007/0120928. In some cases, the fluorinated surfactants are disclosed in formulations without other surfactants, such as in the following publications: U.S. Patent Application 2008/0049086, U.S. Patent Application 2006/0116439, U.S. Pat. No. 7,478,902, U.S. Pat. No. 7,622,513, and U.S. Pat. No. 7,696,262.

It would be desirable to develop new inkjet printing fluid compositions with unique combinations of materials selected to further improve inkjet printing performance.

SUMMARY OF THE INVENTION

In accordance with one embodiment, the invention is directed towards an inkjet printing fluid composition comprising water, a colorant, and a first polymer and a second polymer, wherein the first and second polymers have interactive functional groups and the second polymer is selected to form in the fluid a water soluble associated complex with the first polymer, wherein each of the first and second polymers are present at a concentration of at least 0.1 wt %, and the first and second polymers are present at a combined concentration of at least 1 wt %.

DETAILED DESCRIPTION OF THE INVENTION

Figure 1:
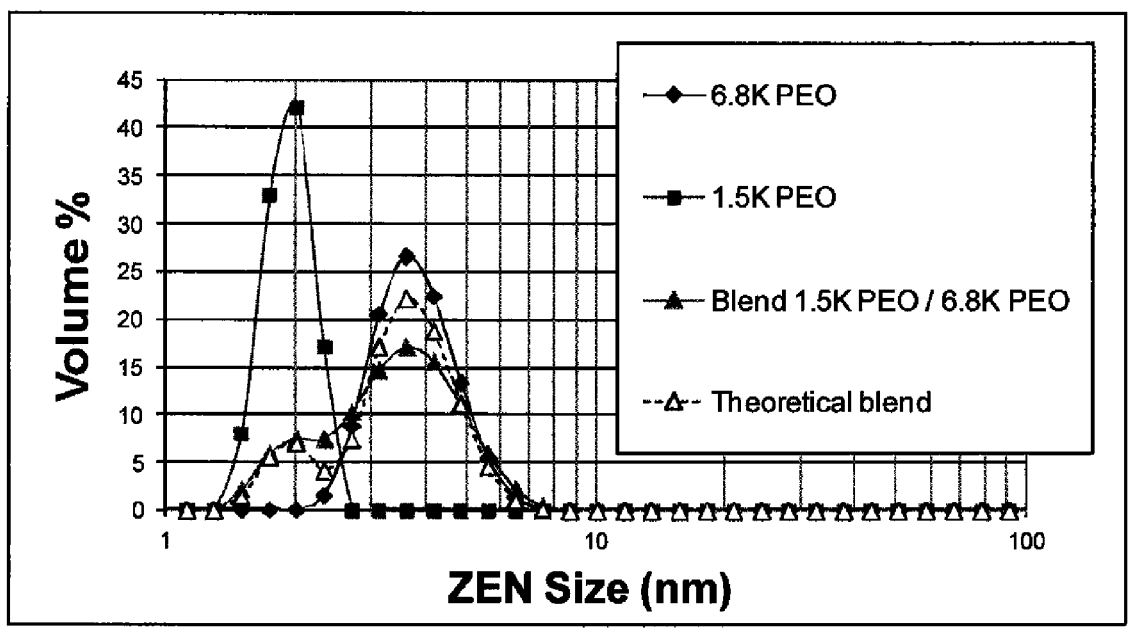
FIG. 1 is a graph depicting Zen Sizer data from a polymer blend of 2% 6.8K PEO and 0.4% 1.5K PEO compared to the individual polymers.

The present specification discloses an exemplary inkjet printing fluid ink formulation configured to improve the optical density of images printed from the inkjet ink.

In accordance with the invention, the inkjet printing fluid includes first and second polymers, wherein the first and second polymers are selected to have interactive functional groups such that the second polymer forms in the fluid a water soluble associated complex with the first polymer. Water soluble complexes of the first and second polymers may be formed as a result of one or more interactive forces acting between the polymers due to functional groups on the polymers. Electrostatic forces between oppositely charged functional groups on the two polymers are the strongest bonding forces. In the solubility parameter literature the remaining associative forces have been categorized into three primary types to describe the solubility characteristics of materials: hydrogen bonding forces, polar forces and dispersion forces. These bonding forces can also cause complexation between the first and second polymers if there is a sufficient energy of interaction of complementary functional groups between the two polymers to overcome the thermal energy of entropic forces. The number of bonding contacts between the two polymers required for complexation varies with the strength of interaction of the forces between the functional groups. Such forces may be used either singly or in combinations to achieve a water associated complex of the first and second polymers. In order for the two polymers to form a polymer complex that remains water soluble and does not precipitate, the functional groups that are not associated between the polymers must have sufficient bonding affinity with the surrounding water matrix. The challenge is to choose functional groups that interact more strongly with one another than with the surrounding water, so that they cause complexation, but still leave enough water soluble groups so that the complex does not precipitate.

One can use electrostatics to create polymer complexes. These are the longest range forces in solution. Having oppositely charged moieties on the two polymers will create strong associations between the polymers. Polyelectrolyte complexes such as between polystyrene sulfonate (PSS is anionic) and chitosan (cationic) occur readily. However, often polyelectrolytes are no longer water soluble once the charges are associated, so the complex precipitates from solution. For example this is the case for polystyrene sulfonate, since the styrene is a high dispersion force moiety which is not polar or hydrogen bonding and thus is not solubilized by water. PSS is only water soluble because of the large energy gain in ionizing the sulfonate charge. In order to form a neutral water soluble electrostatic polymer complex of this type, the backbone of the two polymers should each contain water soluble groups, i.e. ones that are strongly hydrogen bonding or polar. Another way to maintain water solubility is to have an imbalance of charge between the two polymers so that sufficient ionization remains after polymer complexation to maintain solubility. This method yields a polyelectrolyte polymer complex which can be either cationic or anionic.

Polar forces can also be used to create complexation between polymers. Water has a strong dipole moment and a small molecular size. In order for the functional group on one polymer to attract the functional group on a second polymer through polar forces, both functional groups need to either have a dipole moment larger than water or they must allow a closer approach between the functional groups than water can approach, which is seldom possible. There is a further challenge here for using functional groups with strong dipoles in that a strong dipole on one polymer will attract all other nearby dipoles in solution, including those from the same polymer. Typically monomers within a single polymer will be closer spatially to other monomers in the same polymer due to the connectivity of the polymer; this effect is called the correlation hole in polymer physics. Thus most of the polar forces will cause a single polymer to collapse to a smaller size rather than causing it to complex with another polymer. In order to best take advantage of this force for polymer complexation, careful design of the rigidity and sterics of the two polymers is needed to allow the second polymer's dipoles to have a closer approach to a first polymer's dipoles, thus favoring complexation.

Dispersion forces are strong atomic contact forces typically caused by induced-dipoles. Organic molecules like hydrocarbons or aromatic compounds primarily interact through dispersion forces. Dispersion forces are hydrophobic and thus are certainly amenable to causing polymer complexation. Dispersion forces are only attractive and thus the same issues with the correlation hole effect exist requiring careful design of the rigidity and sterics of the two polymers to allow the second polymer's functional groups to have a closer approach to the first polymer's favoring complexation. Examples of this sort of interaction in the literature are found in "hydrophobically modified" polyelectrolytes (HMPE). The addition of a small amount of high dispersion force organic side chain, say styrene, into a polyelectrolyte can impart a polymer collapse due to local complexation which is shear dependent as the chains align in flow, so, for example, many HMPE's show shear thickening.

The Hydrogen bonding force is primarily, but not exclusively, a quantum mechanical force arising from the exchange of electrons. Typically hydrogen bonds form between a moiety with an electron pair (like oxygen) that is in proximity to a functional group with a hydrogen (like an amine or an alcohol). At room temperature a hydrogen bond's energy is typically much weaker, say ~kT/10, than the thermal entropic energy, ~kT, required to cause complexation. This means that hydrogen bonds are constantly forming and being broken in a thermodynamic equilibrium between two polymers with functional groups capable of forming hydrogen bonds. For the polymers to form an associated complex in solution the two polymers must be large enough, i.e. of sufficient molecular weight, so that on average more than ten Hydrogen bonds are formed. Water is both a hydrogen bond receiver and a donor. In order for hydrogen bonds between polymer functional groups to matter they need to be at least similar in strength to those of water. One way of creating polymers that form a hydrogen bonded complex is to choose functional groups on one polymer that are relatively more hydrogen bond receiving, say ethylene oxide, and functional groups on the other polymer that are relatively more hydrogen bond donating, say acrylamide. Another way of forming a hydrogen bonded complex is to design functional groups that hydrogen bond together in a specific sequence and orientation. In DNA, for example, Adenine and Thymine form a "base pair" where there are two hydrogen bonds between the purine group on Adenine and the pyrimidine group on Thymine. Note that in this example there is both a hydrogen bond donating group and a hydrogen bond receiving group on Adenine. In this example the two strands of DNA form a water soluble complex which is held together by a large number of hydrogen bonds.

As used herein, the term "water soluble" when used in relation to polymer complexes and to individual polymers refers to polymers and polymer complexes that form a solution in water that is substantially free of insoluble polymer particles, e.g., such that the turbidity of an aqueous solution containing at least 1 percent by weight of the polymer or polymer complex, at room temperature (25C) and pH between 5-9, will exhibit a reading of less than 20 nephelometric turbidity units (NTU) as measured using a turbidimeter or nephelometer.

While flocculation of dispersed components of an ink before printing is undesirable, flocculation of the ink after printing on a paper surface may be desired to capture more colorant (and in particular, pigments) at or near the paper surface and thus improve optical density. It is known in the art of paper manufacturing, for example, to incorporate salts (like calcium chloride) into higher grades of plain papers, so that the salts are solvated by the ink droplets after printing and screen the electrostatic stabilization of the ink's pigments, causing flocculation at the paper surface and yielding improved optical density. Use of a water soluble complex of first and second polymers in accordance with the present invention in an inkjet printing fluid is believed to work in a similar manner by facilitating flocculation of the printed ink upon contact with the paper surface, while not negatively impacting dispersion stability of the ink prior to printing.

To provide desired effect, each of the first and second polymers of the water soluble complex are present at a concentration of at least 0.1 wt %, and the first and second polymers are present at a combined concentration of at least 1 wt %, as lower concentrations of either polymer or of the combined amount of polymers may be insufficient to generate a water soluble complex of both polymers, or the water soluble complex if formed may be of insufficient concentration to significantly provide improved printed image optical densities. The combined concentration of the first and second polymers is preferably less than 10 wt %, more preferably less than 5 wt %, as too high a concentration can result in higher than desired fluid viscosity. Each of the first and second polymers typically will have a weight average molecular weight of at least about 500, more preferably at least about 1000, so as to be sufficiently polymeric and distinguish from smaller molecule (e.g., monomeric and oligomeric) compounds.

In one specific embodiment, the inkjet printing fluid composition of the invention comprises water, a colorant, and first and second polymers, wherein the first polymer comprises primarily hydrogen bond accepting moieties and the second polymer comprises primarily hydrogen bond donating moieties, and wherein the first and second polymers are present at a concentration of at least 0.1 wt %, and the first and second polymers are present at a combined concentration of at least 1 wt %. The exemplary ink vehicle in such embodiment contains two polymers that form a water soluble hydrogen bonded complex in solution. We will designate Polymer 1 as the more strongly hydrogen bond receiving and Polymer 2 as the more strongly hydrogen bond donating polymer in such embodiment. Each of the first and second polymers are preferably present in the inkjet printing fluid primarily in the form of a hydrogen bonded association comprised of the first and second polymers.

The first and second polymers can have different weight average molecular weights, and the polymer having a relatively higher molecular weight is preferably present at a higher concentration than the polymer having a relatively lower molecular weight. It is preferable that the first polymer has a relatively higher molecular weight than the second polymer.

In preferred embodiments of the invention, each of the first and second polymers are selected from individually water soluble polymers, and the first and second water soluble polymers are each present at a concentration of at least 0.1 wt %, and the first and second water soluble polymers are present at a combined concentration of at least 1 wt %.

In further preferred embodiments of the invention, each of the first and second water soluble polymers are present in the inkjet printing fluid primarily in the form of a hydrogen bonded association comprised of the first and second water soluble polymers. Accordingly, the combined concentration of the polymers in the form of water soluble complex is at least 50% of the total concentration of combined polymers, i.e., at least 0.5 wt % of the printing fluid. Where the first and second polymers are of different molecular weights, it is further preferable that substantially all the lower molecular weight water soluble polymer is associated or complexed with the higher molecular weight water soluble polymer. The total concentration of the polymer complex in said ink vehicle is preferably at a concentration range of from about 0.5 wt % to about 4 wt %, more preferably 1 to about 4 wt %.

The extent of complex formation of polymer mixtures employed in the present invention may be experimentally determined using Quasi-Elastic Light Scatter (QELS) with the Malvern Zetasizer Nano ZS (ZEN) instrument. The distribution of diffusion coefficients of macromolecules in an experimental solution is measured from the QELS autocorrelation function. The distribution of hydrodynamic diameters (OH) is found directly from this distribution of diffusion coefficients by the ZEN software using the Stokes-Einstein equation:

$$D_H = \frac{2kT}{6\pi\eta D}$$

where k is the Boltzmann constant, T is the temperature, and η is the solvent viscosity. Materials analyzed by the ZEN may be analyzed, e.g., at 25 C at an appropriate dilution for the technique. In order to observe the scatter from the polymers to verify complex formation, it may be useful to make solutions without light scattering pigments at the desired concentrations of polymers to match those in pigmented ink examples.

The weight ratio of the two polymers employed in the invention that form a water soluble complex in an ink vehicle is generally, but is in no way limited to, between 1:20 and 20:1 (Polymer 1:Polymer 2), and more preferably between 1:10 and 10:1. The relatively higher molecular weight and relatively lower molecular weight polymers are preferably present at a weight ratio of at least 1:1 respectively, typically from about 20:1 to about 2:1, more preferably of from about 10:1 to about 2:1, more even more preferably of from about 8:1 to about 3:1.

According to one exemplary embodiment, acceptable hydrogen bonding polymers that may be incorporated into the inkjet printing fluid compositions of the invention to form a water soluble polymer complex may include, e.g., but are in no way limited to, polyethyleneoxide (PEO), diamene terminated polyethylene oxide (diAM PEO), Poly2-ethyl oxazoline (PEOX), polyacrylamide (PAM) and polyvinyl alcohol (PVA) produced by, for example, Aldrich or Scientific Polymer Products Inc.

According to one exemplary embodiment, the hydrogen bonding polymer that is more strongly hydrogen bond receiving (Polymer 1) is preferably polyethylene oxide (PEO), diamene terminated polyethylene oxide (diAM PEO), or Poly2-ethyl oxazoline (PEOX) of, but in no way limited to, between 1000 and 10,000 Dalton weight average molecular weight. The first polymer is preferably PEO.

According to one exemplary embodiment, the hydrogen bonding polymer that is more strongly hydrogen bond donating (Polymer 2) is preferably, but is in no way limited to, polyacrylamide (PAM) polymers or polyvinyl alcohol (PVA) of between 1000 and 5,000 Dalton weight average molecular weight produced by, for example, Aldrich or Scientific Polymer Products Inc. The second polymer is preferably PAM.

According to one exemplary embodiment, the water soluble hydrogen bonding polymer that is more strongly hydrogen bond receiving (Polymer 1) is polyethylene oxide (PEO) that may be, but is in no way limited to, 3350 or 6800 Dalton weight average molecular weight and may be incorporated at, but is in no way limited to, a concentration of about 2%. In this exemplary embodiment the hydrogen bonding polymer that is more strongly hydrogen bond donating (Polymer 2) is polyacrylamide (PAM) that may be, but is in no way limited to, about 1500 Dalton weight average molecular weight and may be incorporated at, but is in no way limited to, a concentration of about 0.4%.

In order to drive flocculation at the paper surface, it is desirable to incorporate as much flocculating agent as possible into the ink without compromising the stability of the ink in storage. It is particularly desirable for the flocculating agents in the ink to become activated after printing either by the chemical interaction with the paper surface or by the drying process.

While the mechanism is not entirely clear as to how the use of water soluble complexes of first and second polymers having interactive functional groups such as H-bonded complexes improve optical density, it appears that the associated polymer complexes have a broader range of affinity for papers and pigments than use of either polymer alone. Conceptually this is easy to understand. In the case of water soluble H-bonded complexes, e.g., in solution it takes an average of 4-15 hydrogen bond associations to keep the two polymers in a complexed state (the exact number depends on the strength of the two hydrogen bonding moieties). These hydrogen bonds are weaker than kT, the thermal energy, and thus form and break continually in an equilibrium process. At any given time, therefore, each of these polymers can sustain many more hydrogen bonds (say 25-250 depending on the Mw and polymers chosen) than the bare minimum of 4-15 needed to hold the polymer complex together. Thus when the hydrogen bonded complex encounters a surface that is capable of hydrogen bonding (such as a paper fiber or pigment), it has a large number of hydrogen bonding groups available to associate strongly with the surface without necessarily breaking the polymer-polymer complex.

Thus we conjecture that the two polymers of a water soluble complex can provide affinity for structurally different surfaces allowing the complex to stick two surfaces together that neither polymer alone would. In the language of solubility parameters the effective radius of interaction of the polymer complex exceeds the radius of interaction of either individual polymer. This means that the hydrogen bonded complex with its blend of hydrogen bonding groups provides a more robust association (like a multipurpose glue) regardless of the pigment and paper specifics. For example, a primarily hydrogen donating paper fiber would associated with the PEO in the polymer complex while the PAM associates with the primarily hydrogen bond accepting pigment surface. The hydrogen bonded PEO and PAM complex causes the pigment and paper surfaces to interact over a large range enhancing capture of pigment at the paper surface thus yielding a higher optical density. Effectively the hydrogen bonded polymer complex facilitates bridge flocculation of the pigment to the paper fiber surface. The flexible polymers of the complex can conform to the pigment and fiber surfaces to allow a sufficient number of hydrogen bonds to form to arrest diffusion. Even if it is energetically favorable for the paper and pigment surfaces to hydrogen bond directly, both surfaces are fairly rigid and likely unable to make a sufficient number of hydrogen bonds to stick.

A second possible mechanism for our hydrogen bonded polymer complex to provide enhanced optical density is further proposed. If it is sufficiently energetically favorable for the hydrogen bond receiving polymer (say PEO) to interact with the paper fiber, then the hydrogen bond accepting polymer (say PAM) may be released near the paper surface to act as a pigment flocculant. For this mechanism it would clearly be advantageous to have two polymers complexed together, rather than a single polymer containing both hydrogen bond donating and receiving moieties. Including a single polymer like this in an ink may work well for a specific paper or pigment combination if the interactions of the polymer are tailored to enhance the specific interactions of the pigment and paper. However it will not achieve the broad robust gains in optical density which we find using the hydrogen bonded polymer complexes that we disclose.

In addition to the desirability for an ink to have a good optical density when printed on plain paper, there are a number of constraints on the physical properties of an inkjet ink so that it can function effectively in an inkjet printer and make a lasting image. These properties include viscosity and rheology, ink physical stability, redispersibility of dried ink for circulating systems, surface tension and wetting, and jetting performance including drop formation stability, satellite suppression, print window, latency, and repeated firability. It is also important that inks dry fast on the paper, do not repel one another, and absorb into the substrate without bleeding when over printed with different colors. The dried inks need to have good image permanence including fade and scratch resistance. We will discuss briefly each of these features of the ink indicating how it impacts the selection of possible water soluble polymer complex materials for the present invention.

The ink must have sufficient affinity for the wicking material (felt) to allow the ink to be drawn into the delivery system from the ink tank. This can be achieved by having a combination of low static surface tension driven by the addition of a sufficient quantity of surfactant and strong chemical affinity of the ink for the wicking fibers of the felt primarily driven by the selection of the humectants and polymers.

The ink must be stable against flocculation in the ink tank so that it does not plug the inkjet head and jet poorly. Jetting performance degrades as the effective particle size of pigments in the inks increases above about 150 nm. For pigmented inks this stability constraint necessitates the addition of a well designed dispersants that create stable inks with a combination of electrostatic stabilization, indicated by a large zeta potential, or steric stabilization provided by polymers. Ink stability also limits the addition of salts that can destabilize electrostatically stabilized dispersions and polymers that can cause bridge flocculation. Flocculation stability needs to be sufficiently robust to withstand long hold times as the ink is stored before use, temperature variations during storage, delivery, and jetting, or mechanical agitation such as shear in the ink delivery system. This stability constraint limits the type, addition % and Mw of strongly interacting charged polymers like polyelectrolytes and strongly hydrogen bonding polymers like PAM which are known to destabilize pigmented inks.

The viscosity of the ink is important for use in inkjet printers. Generally viscosity for aqueous based inkjet inks is typically less than 20 cp, preferably less than 10 cp. Back pressure constraints on the delivery system of the ink in some types of inkjet printers may require that the ink viscosity be less than 7 cp. For good jetting performance of the ink in the inkjet head for thermally stimulated drop on demand inkjet printing, inks with less than 2.5 cp viscosity are preferred. The viscosity is determined by the selection of type and interaction between polymers, surfactants, humectants, dispersants and pigments. The viscosity constraint limits the Mw and concentration of polymeric addenda and the total solids content. The ink also cannot have a large elongational viscosity caused by the presence of high Mw polymers (or strongly associating chains of monomers) or the ink will not break into droplets. This typically limits the molecular weight of polymers to below 500K Dalton.

The jetting process introduces additional constraints to the ink. The desire for repeated reproducible firing and good jetting restart after a delay limit the use of polymers or formulation addenda that adhere to and do not redissolve from the heated surfaces of the jetting fixture. It is particularly undesirable for an ink to form insoluble build-up upon heating (coagation). These constraints are particularly limiting upon the type of polymeric addenda. Drop uniformity, satellite formation and print window are impacted by the pigment size and distribution, extensional viscosity, and surface tension which can also be impacted by the addition of polymer addenda. Having a small amount of moderate to high Mw polymer addenda can increase extensional viscosity and suppress satellites improving drop break-up and reducing drop placement errors in printing. These jetting performance attributes can be improved for specific fluids by optimizing the waveform of the drop break-up stimulation pulses. However, generally, having materials that give a robust jetting performance is desirable so that this sort of optimization is not required.

The choice of humectants and surfactant directly impacts the redispersibility of dried ink. This is critical in continuous inkjet systems because the ink that is not printed is redirected to a gutter and recycled. Thus the ink must have a stable and robust humectant and surfactant package so that the ink can be recycled without forming flocculates. The choice of surfactant and humectants also impacts the drying rate and absorption rate into the paper. If inks are not absorbed fast enough they can bleed. In addition, the overprinting of one color ink by a second color ink to give continuous color tone requires the appropriate ordering of the static and dynamic surface tensions of the inks so that subsequent ink droplets are not repelled when they impact an ink drop laid down earlier.

Ink permanence requires that the pigments are not too close to the surface so that they can be physically abraded (scratched). If the pigments are drawn below the surface of the paper they are protected from abrasion, but at the expense of reduced optical density. One can add an overcoat using a layer of polymer, latex or surfactant to provide protection. The requirement of image permanence is thus typically in direct opposition to the desire for large optical densities.

In accordance with the present system and method, an inkjet ink for printing on a desired substrate may include, but is in no way limited to, colorants such as pigments and/or dyes and an ink vehicle including humectants co-solvents and wetting agents.

The colorant of the invention preferably comprises dispersed pigment particles. As used herein, "pigment" refers to a colorant particle which is substantially insoluble in the liquid vehicle in which it was used. Pigments that can be used include self-dispersed pigments and non-self dispersed pigments. Self-dispersed pigments include those that have been chemically surface modified with a charge or a polymeric grouping. This chemical modification aids the pigment in becoming and/or substantially remaining dispersed in a liquid vehicle. The pigment can also be a non self-dispersed pigment that utilizes a separate and unattached dispersing agent (which can be a polymer, an oligomer, or a surfactant, for example) in the liquid vehicle or physically coated on the surface of the pigment.

Pigments that may be used in the invention include those disclosed in, for example, U.S. Pat. Nos. 5,026,427; 5,086,698; 5,141,556; 5,160,370; and 5,169,436. The exact choice of pigments will depend upon the specific application and performance requirements such as color reproduction and image stability. Pigments suitable for use in the invention include, but are not limited to, azo pigments, monoazo pigments, disazo pigments, azo pigment lakes, β-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black.

Examples of black pigments that can be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods such as a channel method, a contact method, a furnace method, an acetylene method, or a thermal method, and are commercially available from such vendors as Cabot Corporation, Degussa AG, and E.I. Dupont de Nemours Company. Suitable carbon black pigments include, without limitation, Cabot pigments including but not limited to Black Pearls 700 and Nipex 180Q which have a polymer dispersant attached to them for stability. Other self-dispersing pigments which have been used in this system are including but not limited to Sensient SDP 1000 and Bonejet CW-3 from Orient Chemicals.

Typical examples of further pigments that may be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66, bridged aluminum phthalocyanine pigments; C.I. Pigment Black 1, 7, 20, 31, 32; C. I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Green 1, 2, 4, 7, 8, 10, 36, 45; C.I. Pigment Violet 1, 2, 3, 5:1, 13, 19, 23, 25, 27, 29, 31, 32, 37, 39, 42, 44, 50, and mixtures thereof.

Pigment-based ink compositions useful in the invention may be prepared by any method known in the art of ink jet printing. Useful methods commonly involve two steps: (a) a dispersing or milling step to break up the pigments to primary particles, where primary particle is defined as the smallest identifiable subdivision in a particulate system, and (b) a dilution step in which the pigment dispersion from step (a) is diluted with the remaining ink components to give a working strength ink.

The milling step (a) is carried out using any type of grinding mill such as a media mill, a ball mill, a two-roll mill, a three-roll mill, a bead mill, and air-jet mill, an attritor, or a liquid interaction chamber. In the milling step (a), pigments are optionally suspended in a medium which is typically the same as or similar to the medium used to dilute the pigment dispersion in step (b). Inert milling media are optionally present in the milling step (a) in order to facilitate break up of the pigments to primary particles. Inert milling media include such materials as polymeric beads, glasses, ceramics, metals and plastics as described, for example, in U.S. Pat. No. 5,891, 231. Milling media are removed from either the pigment dispersion obtained in step (a) or from the ink composition obtained in step (b).

A dispersant is optionally present in the milling step (a) in order to facilitate break up of the pigments into primary particles. For the pigment dispersion obtained in step (a) or the ink composition obtained in step (b), a dispersant is optionally present in order to maintain particle stability and prevent settling. Dispersants suitable for use in the invention include, but are not limited to, those commonly used in the art of ink jet printing. For aqueous pigment-based ink compositions, useful dispersants include anionic, cationic or nonionic surfactants such as sodium dodecylsulfate, or potassium or sodium oleylmethyltaurate as described in, for example, U.S. Pat. No. 5,679,138; U.S. Pat. No. 5,651,813 or U.S. Pat. No. 5,985,017.

Polymeric dispersants are also known and useful in aqueous pigment-based ink compositions. Polymeric dispersants may be added to the pigment dispersion prior to, or during the milling step (a), and include polymers such as homopolymers and copolymers; anionic, cationic or nonionic polymers; or random, block, branched or graft polymers. Polymeric dispersants useful in the milling operation include random and block copolymers having hydrophilic and hydrophobic portions; see for example, U.S. Pat. No. 4,597,794; U.S. Pat. No. 5,085,698; U.S. Pat. No. 5,519,085; U.S. Pat. Nos. 5,272,201; 5,172,133; or U.S. Pat. No. 6,043,297, and PCT Patent Publication Number WO 2004/111140A1; and graft copolymers; see for example, U.S. Pat. No. 5,231,131; U.S. Pat. No. 6,087, 416; U.S. Pat. No. 5,719,204; or U.S. Pat. No. 5,714,538. Among these polymeric dispersants anionic polymeric dispersants are especially useful.

Polymeric dispersants useful for dispersing the pigment particles employed in the present invention are not limited in the arrangement of the monomers comprising the dispersant. The arrangement of monomers may be totally random, or they may be arranged in blocks such as AB or ABA wherein, A is the hydrophobic monomer and B is the hydrophilic monomer. In addition, the polymer may take the form of a random terpolymer or an ABC tri-block wherein, at least one of the A, B and C blocks is chosen to be the hydrophilic monomer and the remaining blocks are hydrophobic blocks dissimilar from one another.

Polymeric dispersants useful for dispersing the pigment particles can be selected from acrylics and styrene-acrylics. Styrene-acrylic polymeric dispersants especially useful in the present invention are copolymers of styrenic monomers and carboxylate monomers. Examples of such dispersants include copolymers of styrene or alphamethyl styrene and acrylic acid or methacrylic acid (such as the JONCRYL (BASF) or TRUDOT (Mead Westvaco) polymers) or styrene maleic anhydride and styrene maleic anhydride amic acid copolymers (such as SMA-1440, SMA-17352, SMA-1000, SMA-2000 (Sartomer Inc.)).

Acrylic polymeric dispersants useful in the present invention are typically formed from one or more acrylic monomer and one or more ionizable monomer, such as, for example carboxylated or sulfonated monomers. Acrylic polymeric dispersants are typically formed from one or more hydrophobic acrylate monomer including, for example, methylmethacrylate, ethylmethacrylate, butylmethacrylate, hexylmethacryate, octylmethacrylate and decylmethacrylate.

Other especially useful polymeric dispersants are those where the hydrophobic monomer is selected from benzyl methacrylate or acrylate, or from acrylic acid esters containing an aliphatic chain having twelve or more carbons and where the hydrophilic monomer is a carboxylated monomer.

Examples of acrylic acid esters having twelve or more carbons include; lauryl acrylate, lauryl methacrylate, tridecyl acrylate, tridecyl methacrylate, tetradecyl acrylate, tetradecyl methacrylate, cetyl acrylate, iso-cetyl acrylate, stearyl methacrylate, iso-stearyl methacrylate, stearyl acrylate, stearyl methacrylate, decyltetradecyl acrylate, and decyltetradecyl methacrylate. Preferably the methacrylate or acrylate monomer is stearyl or lauryl methacrylate or acrylate. The hydrophobic portion of the polymer may be prepared from one or more of the hydrophobic monomers. Desirable carboxylated hydrophilic monomers are acrylic acid or methacrylic acid, or combinations thereof.

In one exemplary embodiment, the pigment particles are dispersed with a copolymer where the hydrophobic monomer is benzyl methacrylate and is present from 50 weight percent to 80 weight percent relative to the total weight of the polymeric dispersant and the hydrophilic monomer is methacrylic acid.

In a second embodiment, copolymer dispersants are employed which comprise a hydrophobic monomer having a carbon chain length of greater than or equal to 12 carbons present in an amount of at least 10% by weight of the total copolymer, and more desirably greater than 20% by weight, an optional additional hydrophobic monomer comprising an aromatic group and a hydrophilic monomer that is methacrylic acid. For example, the additional aromatic group containing monomer may be benzyl acrylate or benzyl methacrylate. An especially useful additional monomer is benzyl methacrylate.

The total amount of hydrophobic monomers, comprising the monomer having a chain with greater than or equal to 12 carbons and optionally, monomer containing an aromatic group, may be present in the polymer in an amount of 20 to 95% by weight of the total polymer. The hydrophobic aromatic-group containing monomer may be present in an amount from about 0 to 85% by weight of the total polymer, more typically from about 0 to 60%, and desirably from about 0 to 50%. A particularly useful embodiment of a polymeric dispersant for the pigment particles is a terpolymer of benzyl methacrylate, stearyl methacrylate and methacrylic acid. Particularly useful polymeric pigment dispersants are further described in US Patent Publication Numbers 2006/0012654 and 2007/0043144, the disclosures of which are incorporated by reference herein.

Composite colorant particles having a colorant phase and a polymer phase are also useful in aqueous pigment-based inks of the invention. Composite colorant particles are formed by polymerizing monomers in the presence of pigments; see for example, U.S. 2003/0199614, U.S. 2003/0203988, or U.S. 2004/0127639. Microencapsulated-type pigment particles are also useful and consist of pigment particles coated with a resin film; see for example U.S. Pat. No. 6,074,467.

The pigments used in the ink composition of the invention may be present in any effective amount, generally from 0.1 to 10% by weight, and preferably from 1 to 6% by weight.

Ink compositions of the present invention are aqueous-based. By aqueous-based, it is meant that the majority of the liquid components in the ink composition are water, preferably greater than 50% water and more preferably greater than 60% water.

The water compositions useful in the invention may also include humectants and/or co-solvents in order to prevent the ink composition from drying out or crusting in the nozzles of the printhead, aid solubility of the components in the ink composition, or facilitate penetration of the ink composition into the image-recording element after printing. Representative examples of humectants and co-solvents used in aqueous-based ink compositions include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) polyhydric alcohols, such as ethylene glycol, diethylene glycol, triethylene glycol, tetraethylene glycol, propylene glycol, polyethylene glycol, polypropylene glycol, 1,2-propane diol, 1,3-propane diol, 1,2-butane diol, 1,3-butane diol, 1,4-butane diol, 1,2-pentane diol, 1,5-pentanediol, 1,2-hexanediol, 1,6-hexane diol, 2-methyl-2,4-pentanediol, 1,2-heptane diol, 1,7-hexane dial, 2-ethyl-1,3-hexane diol, 1,2-octane diol, 2,2,4-trimethyl-1,3-pentane diol, 1,8-octane diol, glycerol, 1,2,6-hexanetriol, 2-ethyl-2-hydroxymethyl-propane diol, saccharides and sugar alcohols and thioglycol; (3) lower mono- and di-alkyl ethers derived from the polyhydric alcohols; such as, ethylene glycol monomethyl ether, ethylene glycol monobutyl ether, ethylene glycol monoethyl ether acetate, diethylene glycol monomethyl ether, and diethylene glycol monobutyl ether acetate (4) nitrogen-containing compounds such as urea, 2-pyrrolidone, N-methyl-2-pyrrolidone, and 1,3-dimethyl-2-imidazolidinone; and (5) sulfur-containing compounds such as 2,2'-thiodiethanol, dimethyl sulfoxide and tetramethylene sulfone.

According to one exemplary embodiment, the present exemplary ink vehicle includes between 1 and 40 wt % humectants and cosolvents, preferably between approximately 10% and 20% humectants and co-solvents. More particularly, according to one exemplary embodiment, the present exemplary ink vehicle includes between approximately 10% and 15% 1,3 propane diol and potentially the addition of up to 1% to 5% polyethylene glycol.

According to one exemplary embodiment, the present exemplary ink vehicle includes, but is in no way limited to, a base vehicle primarily including water, humectants, co-solvents, surfactant, and pigment dispersion. In addition to the above exemplary specific co-solvents that can be used, classes of co-solvents that can be used include, but are in no way limited to, aliphatic alcohols, aromatic alcohols, diols, glycol ethers, polyglycol ethers, caprolactams, formamides, acetamides, and long chain alcohols. Examples of such compounds include, but are in no way limited to, primary aliphatic alcohols, secondary aliphatic alcohols, 1,2-alcohols, 1,3-alcohols, 1-5 alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like.

Further, in addition to the above mention components of the present exemplary vehicle, various other additives may be employed to optimize the properties of the resulting inkjet ink composition for specific applications. More specifically, examples of acceptable additives are those added to inhibit the growth of harmful microorganisms. These additives may be biocides, fungicides, and other microbial agents, which are routinely used in ink formulations. Examples of suitable microbial agents include, but are not limited to, PROXEL GXL (Zeneca Specialties Co.) and KORDEK MLX (Dow Chemical Company) and combinations thereof at a final concentration of 0.0001-0.5 wt. %.

Additional additives which may optionally be present in an ink jet ink composition include thickeners, conductivity enhancing agents, anti-kogation agents, drying agents, water-fast agents, dye solubilizers, chelating agents, binders, light stabilizers, viscosifiers, surfactants, buffering agents, anti-mold agents, anti-curl agents, stabilizers and defoamers.

The pH of the aqueous ink compositions of the invention may be adjusted by the addition of organic or inorganic acids or bases. Useful inks may have a preferred pH of from about 2 to 10, depending upon the type of dye or pigment being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine. Further, buffer solutions may be used to control the pH of the resulting ink.

Surfactants which may be employed in the inkjet printing fluids of the present invention can interact with the water soluble polymer complexes employed therein, to further impact the resulting density of printed images. In a particular embodiment, a surfactant may be employed which is selected to function as a dynamic surface tension agent at an effective concentration such that the printing fluid has a dynamic surface tension $DST_{1\ sec}$ at 1 second universal surface age, a dynamic surface tension $DST_{10\ sec}$ at 10 seconds universal surface age and a dynamic surface tension $DST_{20\ min}$ at 20 minutes universal surface age, where $DST_{20\ min}$ is less than each of $DST_{1\ sec}$ and $DST_{10\ sec}$, and the difference between $DST_{10\ sec}$ and $DST_{20\ min}$ is significant (preferably greater than 9.2 mN/m at 21° C.) or the difference between $DST_{1\ sec}$ and $DST_{20\ min}$ is significant (preferably greater than 15.5 mN/m at 21° C.), and wherein the static surface tension of the ink is further preferably less than 50 mN/m. Dynamic surface tensions may be measured by the hanging drop method as described in copending, commonly assigned U.S. Ser. Nos. 13/435,617 and 13/435,675, both filed Mar. 30, 2012, the disclosures of which are incorporated by reference herein in their entireties, which includes experimentally measuring the ink's density, correcting the measured run time to determine the universal surface age, and measuring and correcting for evaporative effects at a constant temperature of 21° C.

In a particular embodiment of the present invention, fluorinated surface active agents, typically at relatively low concentrations (e.g., less than 1 wt %, and preferably up to about 0.18 wt %), may be employed similarly as disclosed in U.S. Ser. Nos. 13/435,617 and 13/435,675, to obtain similar desired dynamic surface tension properties. The increased density observed through use of water soluble polymer complexes in accordance with the present invention is advantageously further additive to the increased density observed in accordance with such teachings of U.S. Ser. Nos. 13/435,617 and 13/435,675.

Fluorinated surfactants (alternatively referred to as fluorocarbon surfactants, or fluorosurfactants), for use in certain embodiments of the present invention may be independently selected as an nonionic, anionic, cationic or amphoteric or zwitterionic surfactant including at least one fluoro substituent on a carbon atom. In an embodiment, the fluorocarbon surfactant contains a perhalogenated or perfluorinated alkyl terminal group. The specific fluorocarbon surfactant compound or compounds selected may vary based on the other components in the ink and the properties of the one or more inks configured for printing adjacent thereto. By way of example, the fluorocarbon surfactant may be selected such that its ionic character is compatible with that of other components in the inks to avoid or minimize precipitation or flocculation in the ink. Suitable fluorinated compounds are commercially available from companies such as E. I. du Pont de Nemours and Company (Wilmington, Del.) as ZONYL and CAPSTONE surfactants, and from 3M Company (Minneapolis, Minn.) as FLUORAD surfactants, which may be used alone or in combinations.

In the ZONYL series of fluorocarbon surfactants, ZONYL FSO, ZONYL FSN, ZONYL FSH, and ZONYL FS-300 are exemplary nonionic fluorocarbon surfactants that may be used in the present invention. ZONYL FSO is an ethoxylated nonionic fluorocarbon surfactant having the formula $R_fCH_2CH_2O(CH_2CH_2O)_xH$, wherein $R_f$ is $F(CF_2CF_2)_y$, x is 0 to approximately 15, and y is 1 to approximately 7. As supplied, ZONYL FSO has about 50% fluorosurfactant. ZONYL FSN is a water soluble, ethoxylated non-ionic fluorosurfactant that has the structure of $R_fCH_2CH_2O(CH_2CH_2O)_xH$, wherein $R_f$ is $F(CF_2CF_2)_y$, x is 0 to approximately 25, and y is 1 to approximately 9. ZONYL FSN is supplied having about 40% fluorosurfactant. ZONYL FS-300 is a nonionic fluorosurfactant having the structure $R_fCH_2CH_2O(CH_2CH_2O)_xH$, wherein $R_f$ is $F(CF_2CF_2)_y$, x is 3 to approximately 30, and y is 2 to approximately 20, wherein X<Y<Z. As supplied, ZONYL FS-300 has about 40% fluorosurfactant. ZONYL FSD is an exemplary cationic fluorosurfactant and has the structure $F(CF_2CF_2)_{1-7}$-alkyl-$N^+R_3Cl^-$. ZONYL FSD is supplied having about 30% fluorosurfactant. ZONYL FS-500 in an exemplary amphoteric fluorosurfactant and has the structure $C_6F_{13}CH_2CH_2SO_2NHC_3H_6N^+(CH_3)_2CH_2COO^-$.

ZONYL FSA, ZONYL FSP, and ZONYL FSE are exemplary anionic fluorocarbon surfactants that may be used in the present invention. ZONYL FSA is a water soluble lithium carboxylate anionic fluorosurfactant. ZONYL FSE and ZONYL FSP are water-soluble, anionic phosphate fluorosurfactants.

The FLUORAD fluorocarbon surfactants include ammonium perfluoroalkyl sulfonates (FC-120), potassium fluorinated alkyl carboxylates (FC-129), fluorinated alkyl polyoxyethylene ethanols (FC-170C), fluorinated alkyl alkoxylate (FC-171), and fluorinated alkyl ethers (FC-430, FC-431, FC-740).

Other suitable fluorosurfactants include NOVEC 4430 (a fluorosurfactant commercially available from 3M located in St. Paul, Minn.), NOVEC 4432 (a non-ionic fluorosurfactant commercially available from 3M), and NOVEC 4434 (a water-soluble non-ionic fluorosurfactant commercially available from 3M), and oxetane-based fluorocarbon surfactants, including, but are not limited to those generally available from companies such as Omnova Solutions, Inc. of Fairlawn, Ohio under the trade name of POLYFOX fluorocarbon surfactants. Exemplary POLYFOX surfactants include POLYFOX PF-136A, POLYFOX PF-151N, POLYFOX PF-154N, and POLYFOX PF-156A.

According to one exemplary method, the above mentioned components may be selectively combined to form an inkjettable ink. Formation of the inkjettable ink begins, according to one embodiment, by first forming the pigment carrying vehicle. Water and surfactant are combined, humectants and polymers are then added and buffers and biocides if used, and lastly the pigment is added. All components are added under a stirred environment.

Once the ink-jet ink compositions are prepared, they can be placed into one or more ink jet pens as is well known in the art. In one detailed aspect of the present exemplary system and method, an inkjet pen or other system for printing images on a substrate in accordance with the present system and method can include at least one firing chamber containing ink-jet ink compositions, respectively, to form an inkjet pen. Typical ink jet pens can have an orifice plate having a plurality of orifices through which the ink-jet ink composition can be delivered to the substrate. According to one exemplary embodiment, the present formulation may be incorporated into any type of inkjet material disperser including, but in no way limited to, thermally actuated inkjet dispersers, mechanically actuated inkjet dispensers, electrostatically actuated inkjet dispensers, magnetically actuated dispensers, continuous inkjet dispensers, etc.

For color inkjet printing, a minimum of cyan, magenta and yellow inks are required for an ink set which is intended to function as a subtractive color system. Very often black ink is added to the ink set to decrease the ink required to render dark areas in an image and for printing of black and white documents such as text. The need to print on both microporous photoglossy and plain paper receivers can make desirable a plurality of black inks in an ink set. In this case, one of the black inks may be better suited to printing on microporous photoglossy receivers while another black ink may be better suited to printing on plain paper. Use of separate black ink formulations for this purpose can be justified based on desired print densities, printed gloss, and smudge resistance for the type of receiver.

Other inks can be added to the ink set. These inks include light or dilute cyan, light or dilute magenta, light or dilute black, red, blue, green, orange, gray, and the like. Additional inks can be beneficial for image quality but they add system complexity and cost. Finally, colorless ink composition can be added to the ink jet ink set for the purpose of providing gloss uniformity, durability and stain resistance to areas in the printed image which receive little or no ink otherwise. Even for image areas printed with a significant level of colorant containing inks, the colorless ink composition can be added to those areas with further benefits. An example of a protective ink for the above purposes is described in US2006/0100306A1 and US2006/0100308A1.

According to a further embodiment of the present invention, a method for printing an inkjet image on a substrate can be employed by I) providing an inkjet printing fluid according to the present invention; and II) jetting the inkjet printing fluid in the form of ink drops from an inkjet print-head onto a recording element substrate to form a printed image. It is preferable that the substrate be water absorbent, particularly plain or bond paper. The design of the plain paper or bond paper varies widely depending on materials and paper manufacturing processes which should not be construed to limit the scope of the present invention.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to about 20 wt % should be interpreted to include not only the explicitly recited concentration limits of 1 wt % to about 20% but also to include individual concentrations such as 2 wt %, 3 wt %, 4 wt % and sub ranges such as 5 wt % to 15 wt %, 10 wt % to 20 wt %, etc.

For purposes of explanation, numerous specific details are set forth in order to provide a thorough understanding of the present system and method for forming an inkjet ink. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

EXAMPLES

The extent of complex formation of various polymer mixtures were experimentally determined using Quasi-Elastic Light Scatter (QELS) with the Malvern Zetasizer Nano ZS (ZEN) instrument. The distribution of diffusion coefficients of macromolecules in an experimental solution is measured from the QELS autocorrelation function. The distribution of hydrodynamic diameters (DH) is found directly from this distribution of diffusion coefficients by the ZEN software using the Stokes-Einstein equation:

$$D_H = \frac{2kT}{6\pi\eta D}$$

where k is the Boltzmann constant, T is the temperature, and η is the solvent viscosity. Materials analyzed by the ZEN were analyzed at 25 C at an appropriate dilution for the technique. In order to observe the scatter from the polymers to verify complex formation it was necessary to make solutions without light scattering pigments at the desired concentrations of polymers alone to match those in our inventive ink examples.

Example 1

Prior to making ink formulations we first created Black Pearls 700 (BP700) pigment dispersions according to the following method. Weigh BP700 pigment into the milling vessel. Add dispersant (a 65/10/25 weight ratio copolymer of benzyl methacrylate/stearyl methacrylate/methacrylic acid neutralized with dimethylaminoethanol) at a level that is 15% by weight of the pigment level. Add water so that % pigment in the dispersion is approximately 15%. Add milling media (typically styrene/divinyl benzene 20/80 polymeric beads) equal in weight to the total dispersion weight. Combine these materials and mix slowly at ~300 RPM on the media mill which is fitted with a Cowles blade. Continuously cool by pumping chilled water through the dispersion vessel. After the dispersion has thinned some, increase to ~1500 RPM until a reasonable mixing is obtained. Mill dispersion for 24 hours. Filter off beads using high pressure filter apparatus and measure the particle size and % solids of the pigment dispersion.

Comparative Ink #1-A0 was prepared by combining enough of the pigment dispersion to give 4.5 wt % Black Pearls 700 pigment (BP700), 12.00 wt % 1,3-propanediol, 3.00 wt % polyethylene glycol (400 mw, labeled PEG-400), 0.18% Surfynol 465 surfactant, and 0.20% triethylamine with the balance as water.

Comparative Inks 3-B0, 5-C0, 6-D0 were prepared similarly to Comparative Ink 1-A0, substituting the surfactant as indicated in Table 1. Water levels were adjusted as the component levels varied to maintain to proper weight percents of each component. These inks do not contain the polymer complexes and serve as control inks to show the impact of varying the surfactant type only.

Inventive Inks 1-20 which are categorized into A-D series and labeled A2-A3, A5-A8, B2-B3, B5-B8, C1, C3-C8, D2-D3 and Comparison Inks 2-A9, 4-B9, and 7-D9 were prepared similarly to Ink A0, substituting the surfactant and adding polymer 1 and polymer 2 as indicated in Table 1.

TABLE 1

A, B, C and D Series Ink Formulations

| Example ID | Polymer 1 Poly. 1 | wt % | Polymer 2 Poly. 2 | wt % | Surfactant | wt % |
|---|---|---|---|---|---|---|
| Comp. 1-A0 | — | 0.00% | — | 0.00% | Surfynol 465 | 0.18% |
| Inv. 1-A2 | PEO 3.35K | 2.00% | PAM 1.5K | 0.40% | Surfynol 465 | 0.18% |
| Inv. 2-A3 | PEO 6.8K | 2.00% | PAM 1.5K | 0.40% | Surfynol 465 | 0.18% |
| Inv. 3-A5 | PEO 6.8K | 2.00% | PVA 2K | 1.00% | Surfynol 465 | 0.18% |
| Inv. 4-A6 | PEO 6.8K | 2.00% | PEO2N 2K | 1.00% | Surfynol 465 | 0.18% |
| Inv. 5-A7 | PEOX 5K | 1.00% | PAM 1.5K | 1.00% | Surfynol 465 | 0.18% |
| Inv. 6-A8 | PEO2N 2K | 1.00% | PAM 1.5K | 0.40% | Surfynol 465 | 0.18% |
| Comp. 2-A9 | PEO 20K | 0.05% | PAM 1.5K | 0.50% | Surfynol 465 | 0.18% |
| Comp. 3-B0 | — | 0.00% | — | 0.00% | Tergitol 15-s-12 | 0.18% |
| Inv. 7-B2 | PEO 3.35K | 2.00% | PAM 1.5K | 0.40% | Tergitol 15-s-12 | 0.18% |
| Inv. 8-B3 | PEO 6.8K | 2.00% | PAM 1.5K | 0.40% | Tergitol 15-s-12 | 0.18% |
| Inv. 9-B5 | PEO 6.8K | 2.00% | PVA 2K | 1.00% | Tergitol 15-s-12 | 0.18% |
| Inv. 10-B6 | PEO 6.8K | 2.00% | PEO2N 2K | 1.00% | Tergitol 15-s-12 | 0.18% |
| Inv. 11-B7 | PEOX 5K | 1.00% | PAM 1.5K | 1.00% | Tergitol 15-s-12 | 0.18% |
| Inv. 12-B8 | PEO2N 2K | 1.00% | PAM 1.5K | 0.40% | Tergitol 15-s-12 | 0.18% |
| Comp. 4-B9 | PEO 20K | 0.05% | PAM 1.5K | 0.50% | Tergitol 15-s-12 | 0.18% |
| Comp. 5-C0 | — | 0.00% | — | 0.00% | Strodex PK-90 | 0.16% |
| Inv. 13-C1 | PEO 3.35K | 1.75% | PAM 1.5K | 0.40% | Strodex PK-90 | 0.16% |
| Inv. 14-C3 | PEO 6.8K | 2.00% | PAM 1.5K | 0.40% | Strodex PK-90 | 0.16% |
| Inv. 15-C4 | PEO 6.8K | 3.60% | PAM 1.5K | 1.00% | Strodex PK-90 | 0.16% |
| Inv. 16-C5 | PEO 6.8K | 2.00% | PVA 2K | 1.00% | Strodex PK-90 | 0.16% |
| Inv. 17-C6 | PEO 6.8K | 2.00% | PEO2N 2K | 1.00% | Strodex PK-90 | 0.16% |
| Inv. 18-C7 | PEOX 5K | 1.00% | PAM 1.5K | 1.00% | Strodex PK-90 | 0.16% |
| Inv. 19-C8 | PEO2N 2K | 1.00% | PAM 1.5K | 0.40% | Strodex PK-90 | 0.16% |
| Comp. 6-D0 | — | 0.00% | — | 0.00% | Zonyl FSP | 0.02% |
| Inv. 20-D2 | PEO 3.35K | 2.00% | PAM 1.5K | 0.40% | Zonyl FSP | 0.02% |
| Inv. 21-D3 | PEO 6.8K | 2.00% | PAM 1.5K | 0.40% | Zonyl FSP | 0.02% |
| Comp. 7-D9 | PEO 20K | 0.05% | PAM 1.5K | 0.50% | Zonyl FSP | 0.02% |

Note that each series (A-D) has a different surfactant. The only difference between the Ax, Bx, Cx and Dx formulations is the surfactant used. For example, Invention 1-A2 and Invention 7-B2 inks use identical polymers (2.0% PEO 3.35K Dalton molecular weight and 0.40% PAM 1.5K Dalton molecular weight) and only differ in surfactant type (Surfynol 465 versus Tergitol 15-s-12). The polymer type designation is given before the molecular weight in the Polymer 1 and Polymer 2 columns. For example Inventive Ink 2-A2 has "PEO 3.35K" which indicates that polyethylene oxide (PEO) of 3,350 Dalton molecular weight was added at a level of 2.0% by weight. The other polymer types used in Table 1 are PEO2N (a diamine terminated polyethylene oxide), PEOX (poly-2-ethyl-2-oxazoline), PVA (polyvinyl alcohol) and PAM (polyacrylamide) of the indicated molecular weights. Water levels were adjusted as the component levels varied to maintain to proper weight percents of each component.

After each of the inks was prepared, a drawdown (designated DD) was made by placing 3 drops of ink onto one or more porous substrates and drawdown using a #3 coating rod. Select inks were also loaded into inkjet cartridges and jetted from an inkjet head onto one or more porous substrates. Densities were read using a MacBeth densitometer as illustrated for our control Comparison Inks 1-A0, 3-B0, 5-C0, and 7-D0 in Table 2. Substrate 1 was a Georgia Pacific Premium Multi-Use Paper, substrate 2 was IPdataspeed plain bonded paper, and substrate 3 was Georgia Pacific Inkjet Paper.

TABLE 2

Optical Density of Control Comparison Inks A0, B0, C0 and D0 without Polymer Complexes.

| | | | | DD Density | | | Inkjet Printed Density | | |
|---|---|---|---|---|---|---|---|---|---|
| Example ID | Poly. 1 | Poly. 2 | Surfactant | Sub. 1 | Sub. 2 | Sub. 3 | Sub. 1 | Sub. 2 | Sub. 3 |
| Comp. A0 | — | — | Surfynol 465 | | 0.917 | 1.245 | 0.981 | 1.003 | 1.173 |
| Comp. B0 | — | — | Tergitol 15-s-12 | 0.920 | 0.980 | | | | |
| Comp. C0 | — | — | Strodex PK-90 | 1.012 | 1.206 | | 0.934 | 1.237 | |
| Comp. D0 | — | — | Zonyl FSP | 1.240 | 1.328 | | 1.295 | 1.361 | |

To analyze the contribution to optical density due to our polymer blends and minimize the variability due to the porous substrate and other addenda in the ink formulation, each example ink was drawdown or printed with a control comparison ink on the same sheet of porous substrate. We then subtracted the control ink optical density from the measured example ink optical density and expressed the result as the optical density gain. In Table 3 we show the optical density gain for all of our ink formulations. The surfactant used in the ink formulation can interact with the Hydrogen bonded complex, so we show the broad utility of our complex by demonstrating the improved density using four different surfactant systems.

TABLE 3

Density Gain of Inventive Examples 1-8 and Non-inventive Example 9 in select inks from series A, B, C and D.

| Example ID | Poly. 1 | Poly. 2 | Surfactant | DD Density Sub. 1 | DD Density Sub. 2 | DD Density Sub. 3 | Inkjet Printed Density Sub. 1 | Inkjet Printed Density Sub. 2 | Inkjet Printed Density Sub. 3 |
|---|---|---|---|---|---|---|---|---|---|
| Inv. 1-A2 | PEO 3.35K | PAM 1.5K | Surfynol 465 | | 0.056 | 0.113 | 0.038 | 0.053 | 0.081 |
| Inv. 2-A3 | PEO 6.8K | PAM 1.5K | Surfynol 465 | | 0.082 | 0.130 | 0.048 | 0.081 | 0.009 |
| Inv. 3-A5 | PEO 6.8K | PVA 2K | Surfynol 465 | | 0.058 | −0.043 | | −0.001 | −0.133 |
| Inv. 4-A6 | PEO 6.8K | PEO2N 2K | Surfynol 465 | | 0.061 | 0.080 | | 0.065 | 0.016 |
| Inv. 5-A7 | PEOX 5K | PAM 1.5K | Surfynol 465 | | 0.047 | 0.049 | | 0.038 | 0.061 |
| Inv. 6-A8 | PEO2N 2K | PAM 1.5K | Surfynol 465 | | 0.005 | −0.062 | | 0.000 | −0.033 |
| Comp. 2-A9 | PEO 20K | PAM 1.5K | Surfynol 465 | | 0.023 | 0.052 | 0.050 | 0.036 | −0.003 |
| Inv. 7-B2 | PEO 3.35K | PAM 1.5K | Tergitol 15-s-12 | 0.195 | 0.231 | | | | |
| Inv. 8-B3 | PEO 6.8K | PAM 1.5K | Tergitol 15-s-12 | 0.242 | 0.182 | | | | |
| Inv. 9-B5 | PEO 6.8K | PVA 2K | Tergitol 15-s-12 | 0.106 | 0.039 | | | | |
| Inv.-B6 | PEO 6.8K | PEO2N 2K | Tergitol 15-s-12 | 0.090 | 0.129 | | | | |
| Inv. 11-B7 | PEOX 5K | PAM 1.5K | Tergitol 15-s-12 | 0.071 | 0.153 | | | | |
| Inv. 12-B8 | PEO2N 2K | PAM 1.5K | Tergitol 15-s-12 | −0.008 | −0.046 | | | | |
| Comp. 4-B9 | PEO 20K | PAM 1.5K | Tergitol 15-s-12 | −0.010 | 0.027 | | | | |
| Inv. 13-C1 | PEO 3.35K | PAM 1.5K | Strodex PK-90 | 0.162 | 0.072 | | 0.073 | 0.113 | |
| Inv. 14-C3 | PEO 6.8K | PAM 1.5K | Strodex PK-90 | 0.110 | 0.164 | | 0.079 | 0.093 | |
| Inv. 15-C4 | PEO 6.8K | PAM 1.5K | Strodex PK-90 | 0.127 | 0.220 | | 0.138 | 0.053 | |
| Inv. 16-C5 | PEO 6.8K | PVA 2K | Strodex PK-90 | 0.101 | −0.030 | | | | |
| Inv. 17-C6 | PEO 6.8K | PEO2N 2K | Strodex PK-90 | 0.028 | 0.133 | | | | |
| Inv. 18-C7 | PEOX 5K | PAM 1.5K | Strodex PK-90 | 0.031 | 0.025 | | | | |
| Inv. 19-C8 | PEO2N 2K | PAM 1.5K | Strodex PK-90 | −0.004 | 0.130 | | | | |
| Inv. 20-D2 | PEO 3.35K | PAM 1.5K | Zonyl FSP | 0.085 | 0.066 | | 0.095 | −0.100 | |
| Inv. 21-D3 | PEO 6.8K | PAM 1.5K | Zonyl FSP | 0.063 | −0.064 | | 0.096 | 0.060 | |
| Comp. 7-D9 | PEO 20K | PAM 1.5K | Zonyl FSP | 0.053 | 0.014 | | 0.056 | −0.003 | |

All of the hydrogen bonded complexes disclosed in Examples 1-8 give measurable and significant gains in optical density, greater than 0.1 OD, on at least one of the three porous substrates used. Our three preferred embodiments (Examples 1-3) each gave greater than 0.15 OD gain on at least one of the porous substrates. We successfully printed these preferred inks using an ink jetting system and showed greater than 0.05 OD gain on two porous substrates. The printed OD gain should approach the OD gain on drawdown with optimization of the jetting conditions.

In contrast, the comparison examples 9A, 9B, and 9D do not show greater than 0.05 OD gain on any of the porous substrates despite having 0.5% PAM. This is a direct evaluation of the polymers employed in U.S. Pat. No. 6,475,271(B2) Example 6, demonstrating that this formulation which has too low of a concentration of a higher molecular weight PEO does not give the optical density gains that we find with our invention. In contrast, our inventive example shows optical density benefit on both papers between 0.06 and 0.10 OD gain in drawdowns and prints. This shows generally that the addition of 0.5% PAM 1.5K molecular weight with 0.05% 20K PEO is insufficient to get the optical density gains of the present invention. Clearly PAM addition alone is also not sufficient to achieve the improved density of the invention without forming the complex with a second polymer.

FIG. 1 depicts Zen Sizer data from a polymer blend of 2% 6.8K PEO and 0.4% 1.5K PEO compared to the individual polymers. The combination of two different molecular weight PEO polymers yields the expected bimodal size distribution for non-associated water soluble polymers, as the ethylene oxide units are primarily hydrogen bond accepting and thus do not interact strongly enough to cause a water soluble complex to form. The shape and position of the peaks of the bimodal distribution match well the expected size for a non-interacting blend of the individual polymers.

Figure 2:
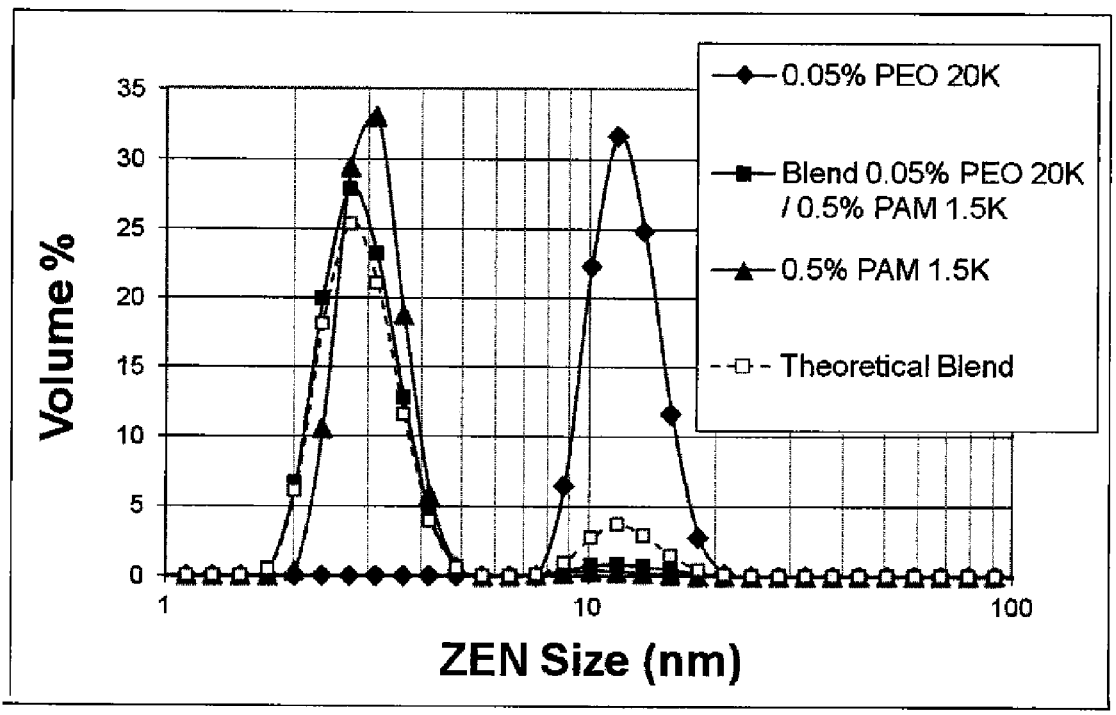
FIG. 2 is a graph depicting Zen Sizer data from a polymer blend of 0.05% 20K PEO and 0.5% 1.5K PAM compared to the individual polymers.

An aqueous solution of 0.05% 20K PEO and 0.5% PAM 1.5K (similarly as used in comparative examples 2, 4 and 7) was prepared and evaluated for complexation. FIG. 2 shows the Zen Sizer distributions of the individual polymers and of the mixture of the two polymers. There is evidence that even at such relatively low concentration, some of the 20K PEO does NOT form a complex with the 1.5K PAM since the distribution is bimodal and shows a second peak at 15 nm. The size of the primary peak for the blend is dominated by the size of the PAM, which is the polymer at a higher concentration and lower molecular weight, rather than the PEO chain as is seen in the inventive examples shown in FIG. 3.

Figure 3:
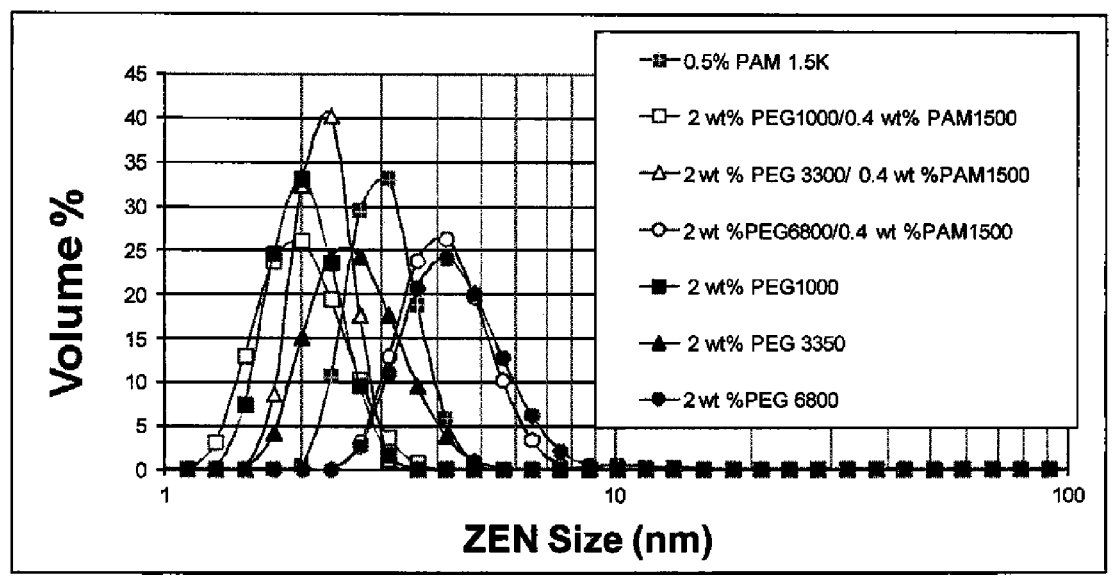
FIG. 3 is a graph depicting Zen Sizer data from polymer blends of 0.4% 1.5K PAM with 2% PEO of three molecular weights: 1K, 3.35K PEO and 6.8K PEO and compares these distributions to the size distributions of the individual polymers.

In FIG. 3 we compare the Zen Sizer distribution of polymer blends of 0.4% 1.5K PAM made with 1K, 3.35K, and 6.8K PEO. These combinations of polymers are used in the polymer blends in inventive examples 1, 2, 7, 8, 13, 14, 15, 20 and 21. These blends show a single peak in the size distribution indicating that a polymer complex has formed in solution. The size of the peak reflects primarily the size of the higher molecular weight PEO component and thus increases systematically with PEO size (Mw). In contrast, the size for the 0.05% 20K blend in FIG. 2 is dominated by PAM not PEO Mw due to low PEO concentration. It is particularly notable to compare the 6.8K PEO blend which shows no evidence of a peak near the 1.5K PAM size with the 20K blend which shows its primary peak very close to the 1.5K size. This suggests a fundamentally different structure for the 0.05% 20K PEO blend in comparison to the inventive complexes.

Example 2

An inventive ink formulation was prepared similarly as in Example 1, except using a similarly polymer dispersant dispersed magenta pigment in place of the black pigment dispersion, with the further components and with and without our preferred inventive complex as detailed in Table 4.

TABLE 4

Magenta E Series Ink Formulations: Invention 22-E2 and Comparison 10-E0

| COMPONENT | Weight percent | |
|---|---|---|
| | Comparison 10-E0 | Invention 22-E2 |
| Zonyl FSP | 0.02 | 0.02 |
| 1,3 propanediol | 12.00 | 12.00 |
| PEG 400 | 3.00 | 3.00 |
| TEA (20%) | 0.20 | 0.20 |
| MAGENTA DISPERSION | 3.90 | 3.90 |
| 3.35K PEO | | 2.00 |
| 1.5K PAM | | 0.40 |

The effect of adding the hydrogen bonded polymer complex on optical density was found by subtracting the optical density of our control ink, comparison 10-E0, from the optical density of Inventive Ink 22-E2. The E series uses the same Zonyl FSP surfactant that we used in the D series, the only difference was changing to magenta pigment dispersion. Inventive ink 22-E2 lost 0.047 OD for drawdowns on substrate 1 (this was an optical density reduction of 1.7 standard deviations) but gained 0.068 OD for drawdowns on substrate 2 (this was an optical density gain of 4.4 standard deviations). Thus, including the water soluble polymer complex gave a statistically significant enhanced density with magenta pigment on substrate 2.

Example 3

In Table 7 we summarize the optical density gain and felt wetting impact of adding our preferred hydrogen bonded complex to four black pigmented inks with different surfactants. We measured the dynamic surface tension of these inks using the hanging drop and maximum bubble pressure methods as described in co-pending, commonly assigned U.S. Ser. Nos. 13/435,617 and 13/435,675, incorporated by reference above. As described in detail in those applications, we calculated "DST metric 2" which is the difference between dynamic surface tension at 10 s universal surface age and 20 minute universal surface age. For each series we calculated the optical density difference between the inventive ink and the control comparison ink from the same series to find the change in optical density, "delta OD", caused by the addition of our preferred inventive hydrogen bonded complex. We used the following metrics for felt wetting and optical density:

TABLE 5

Felt Wetting Metric

| | | |
|---|---|---|
| H | less than 2 seconds | best inks |
| E | between 2 and 4 seconds | prints easily |
| S | between 4 and 6 seconds | prints well |
| A | between 6 and 12 seconds | prints OK |
| B | between 12 and 18 seconds | will print (may require pressure) |
| C | between 18 and 300 seconds | marginal: may print with pressure |
| D | greater than 300 seconds | poor: will not wet felt, does not print |

TABLE 6

Optical Density Gain Metric

H = gain in OD greater than 0.145

E = gain in OD between 0.095 and 0.145

S = gain in OD between 0.065 and 0.095

A = gain in OD between 0.035 and 0.065

B = gain in OD between 0.015 and 0.035

C = gain in OD between 0.000 and 0.015

D = gain in OD less than 0.000

The average gain in optical density for our three porous substrates is compared to Table 6 to determine the first letter of our metric. The second letter of our metric represents the smallest gain found from any of the porous substrates while the third letter of our metric represents the largest gain from any of the porous substrates.

TABLE 7

Ink Inventions 23-26 and Comparisons 11-14 for F, G, H and I Series Surfactants

| Example ID | Surfactant 1 (type) | Conc. (w/w) | Complex? (2.0% PEO 3.35K + 0.4% PAM 1.5K) | DST Metric 2 (10 s-20 m) (mN/m) | 3 paper average OD | 3 paper average delta OD | Drawdown Optical Density Gain Metric ave/low/high | Felt Wetting Metric |
|---|---|---|---|---|---|---|---|---|
| Inv. 23-F2 | Surfynol 465 | 0.400% | y | 0.15 | 1.060 | 0.097 | EAH | H |
| Comp. 11-F0 | Surfynol 465 | 0.400% | n | 0.00 | 0.963 | | | H |
| Inv. 24-G2 | Tergitol 15-s-12 | 0.400% | y | 2.88 | 1.258 | 0.195 | HSH | H |
| Comp. 12-G0 | Tergitol 15-s-12 | 0.400% | n | 0.97 | 1.062 | | | E |
| Inv. 25-H2 | Zonyl FSO | 0.050% | y | 8.55 | 1.341 | 0.096 | EDH | H |
| Comp. 13-H0 | Zonyl FSO | 0.050% | n | 10.82 | 1.245 | | | B |
| Inv. 26-I2 | Zonyl FSP | 0.050% | y | 23.29 | 1.346 | 0.068 | SBH | E |
| Comp. 14-I0 | Zonyl FSP | 0.050% | n | 23.68 | 1.278 | | | C |

Our hydrogen bonded complex does not increase the DST metric 2 significantly compared to the control inks. However, we do see enhanced optical density for each of our inventive inks, showing an H rating on at least one substrate and an average increase in optical density on all three substrates. Our hydrogen bonded complex also improves felt wetting compared to the control ink for inventive inks 24-26 compared to their control inks 12-14. This is a further unanticipated advantage of our complex.

Since DST Metric 2 is not significantly higher with our complex we conclude that the mechanism of optical density enhancement for our complex is different than that described in U.S. Ser. Nos. 13/435,617 and 13/435,675. It is clear that the hydrogen bonded complex and fluorosurfactant addition both enhance optical density in an additive manner because they operate on different physical principles.

The above examples illustrate a number of embodiments of the present systems and methods that are presently known. However, it is to be understood that the above are only exemplary or illustrative of the application of the principles of the present systems and methods. Numerous modifications and alternative compositions, methods, and systems may be devised by those skilled in the art without departing from the spirit and scope of the present systems and methods. The appended claims are intended to cover such modifications and arrangements. Thus, while the present systems and methods have been described above with particularity, the above examples provide further detail in connection with what are presently deemed to be acceptable embodiments.

The invention has been described in detail with particular reference to certain preferred embodiments thereof, but it will be understood that variations and modifications can be effected within the spirit and scope of the invention.

The invention claimed is:

1. An inkjet printing fluid composition comprising water, a colorant, and a first polymer and a second polymer, wherein the first and second polymers have interactive functional groups and the second polymer is selected to form in the fluid a water soluble associated complex with the first polymer, wherein each of the first and second polymers are present at a concentration of at least 0.1 wt %, and the first and second polymers are present at a combined concentration of at least 1 wt %, and wherein the first polymer comprises primarily hydrogen bond accepting moieties and the second polymer comprises primarily hydrogen bond donating moieties.

2. The inkjet printing fluid of claim 1, wherein the colorant comprises dispersed pigment particles.

3. The inkjet printing fluid of claim 2, wherein the pigment particles are dispersed with a polymeric dispersant or a surfactant.

4. The inkjet printing fluid of claim 2, wherein the pigment particles are present at a weight concentration of from 1 to 10 wt %.

5. The inkjet printing fluid of claim 1, wherein each of the first and second polymers individually are water soluble.

6. The inkjet printing fluid of claim 5, wherein each of the first and second water soluble polymers are present in the inkjet printing fluid primarily in the form of a hydrogen bonded associated complex comprised of the first and second water soluble polymers.

7. The inkjet printing fluid of claim 5, wherein the first and second polymers have different weight average molecular weights, and the first or second polymer having a relatively higher molecular weight is present at a higher concentration than the first or second polymer having a relatively lower molecular weight.

8. The inkjet printing fluid of claim 7, wherein the relatively higher molecular weight and relatively lower molecular weight polymers are present at a weight ratio of from about 20:1 to about 2:1.

9. The inkjet printing fluid of claim 7, wherein the relatively higher molecular weight and relatively lower molecular weight polymers are present at a weight ratio of from about 10:1 to about 2:1.

10. The inkjet printing fluid of claim 7, wherein the relatively higher molecular weight and relatively lower molecular weight polymers are present at a weight ratio of from about 8:1 to about 3:1.

11. The inkjet printing fluid of claim 7, wherein substantially all of the lower molecular weight first or second polymer is associated with the higher molecular weight first or second polymer.

12. The inkjet printing fluid of claim 5, wherein the first polymer has a relatively higher weight average molecular weight than the second polymer.

13. The inkjet printing fluid of claim 1, wherein the first polymer is polethylene oxide.

14. The inkjet printing fluid of claim 13, wherein the second water soluble polymer is polyacrylamide.

15. The inkjet printing fluid of claim 1, further comprising a humectant.

16. The inkjet printing fluid of claim 1, further comprising a fluorinated surfactant present at a concentration of less than 1 wt %.

17. The inkjet printing fluid of claim 1, further comprising a fluorinated surfactant present at a concentration of up to 0.18 wt %.

18. A method for printing an inkjet image comprising:
   a. providing an inkjet printing fluid according to claim 1; and
   b. jetting the inkjet printing fluid in the form of ink drops onto a recording element to form a printed image.

* * * * *